May 28, 1940.    J. C. WHITE    2,202,278
LIGHTING DEVICE
Filed Dec. 30, 1936    3 Sheets-Sheet 2
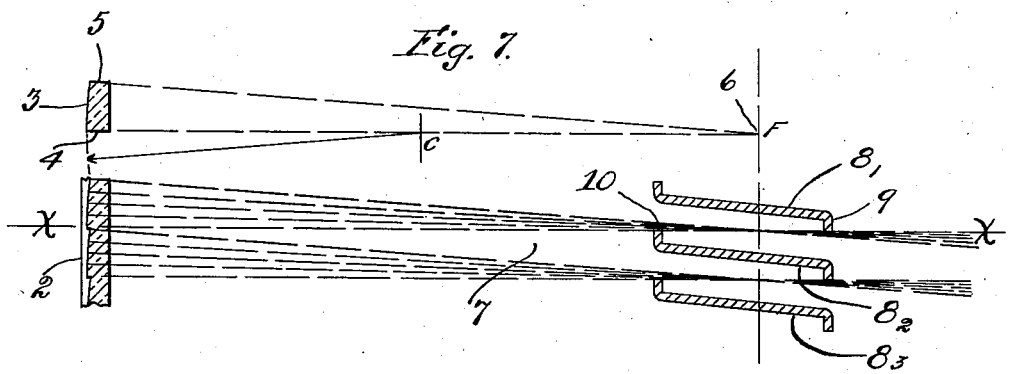
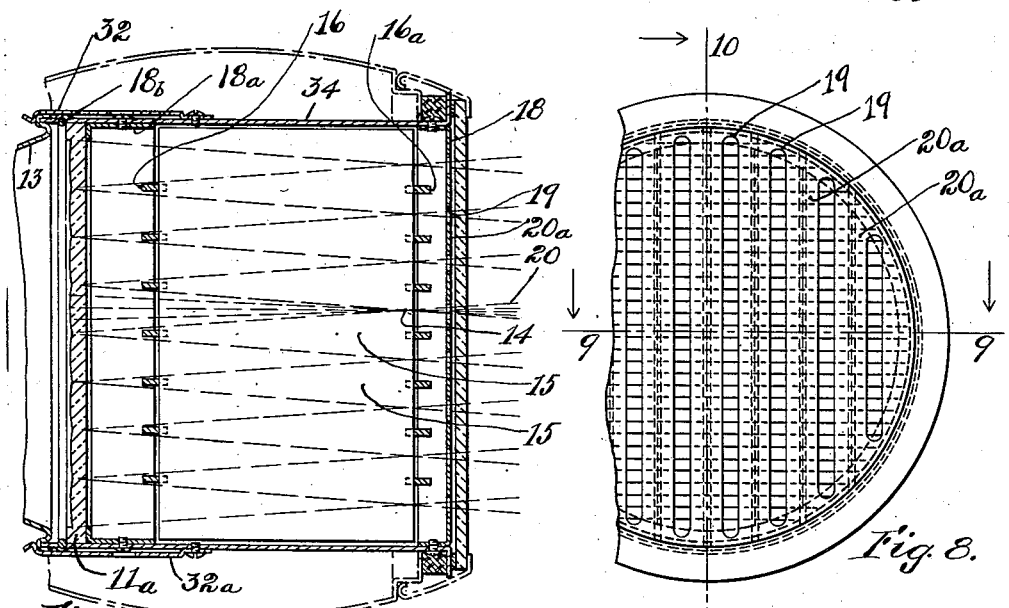
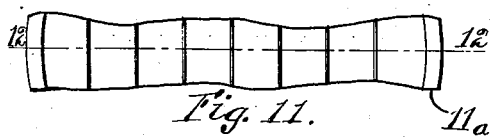
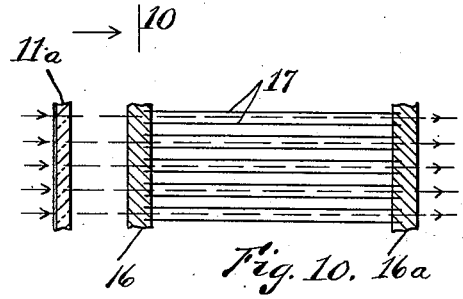
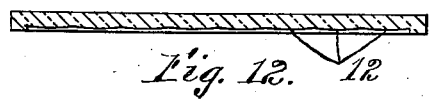
Inventor
Joseph C. White
by George A. Rockwell
Atty May 28, 1940.   J. C. WHITE   2,202,278
LIGHTING DEVICE
Filed Dec. 30, 1936   3 Sheets-Sheet 3
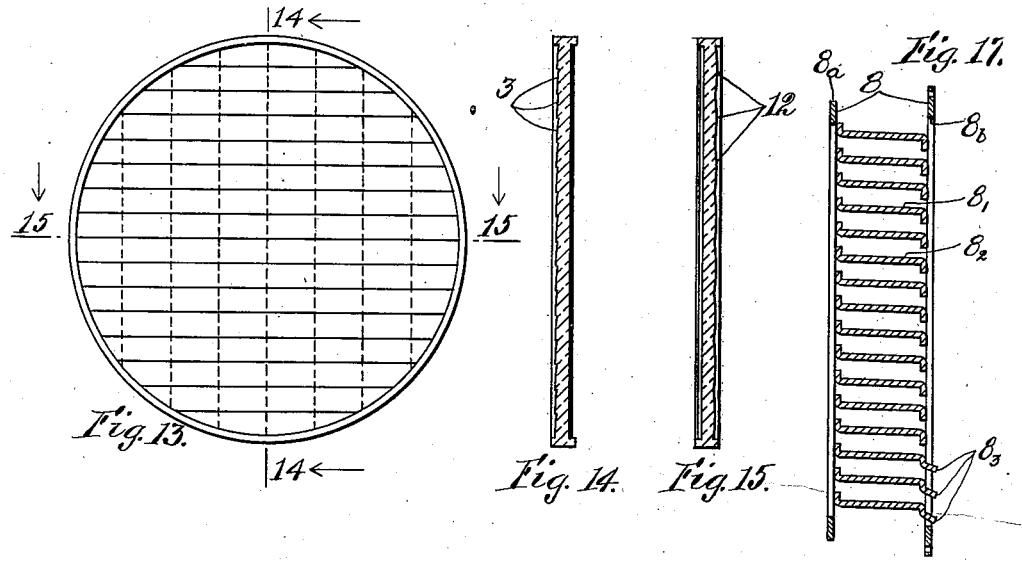
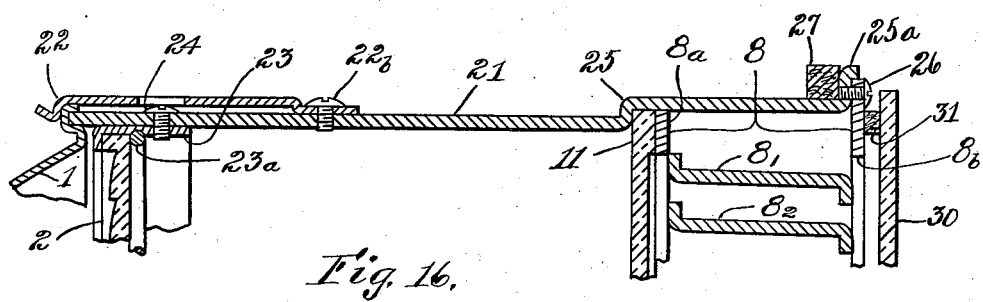
Inventor
Joseph C. White
by George A Rockwell
Atty Patented May 28, 1940

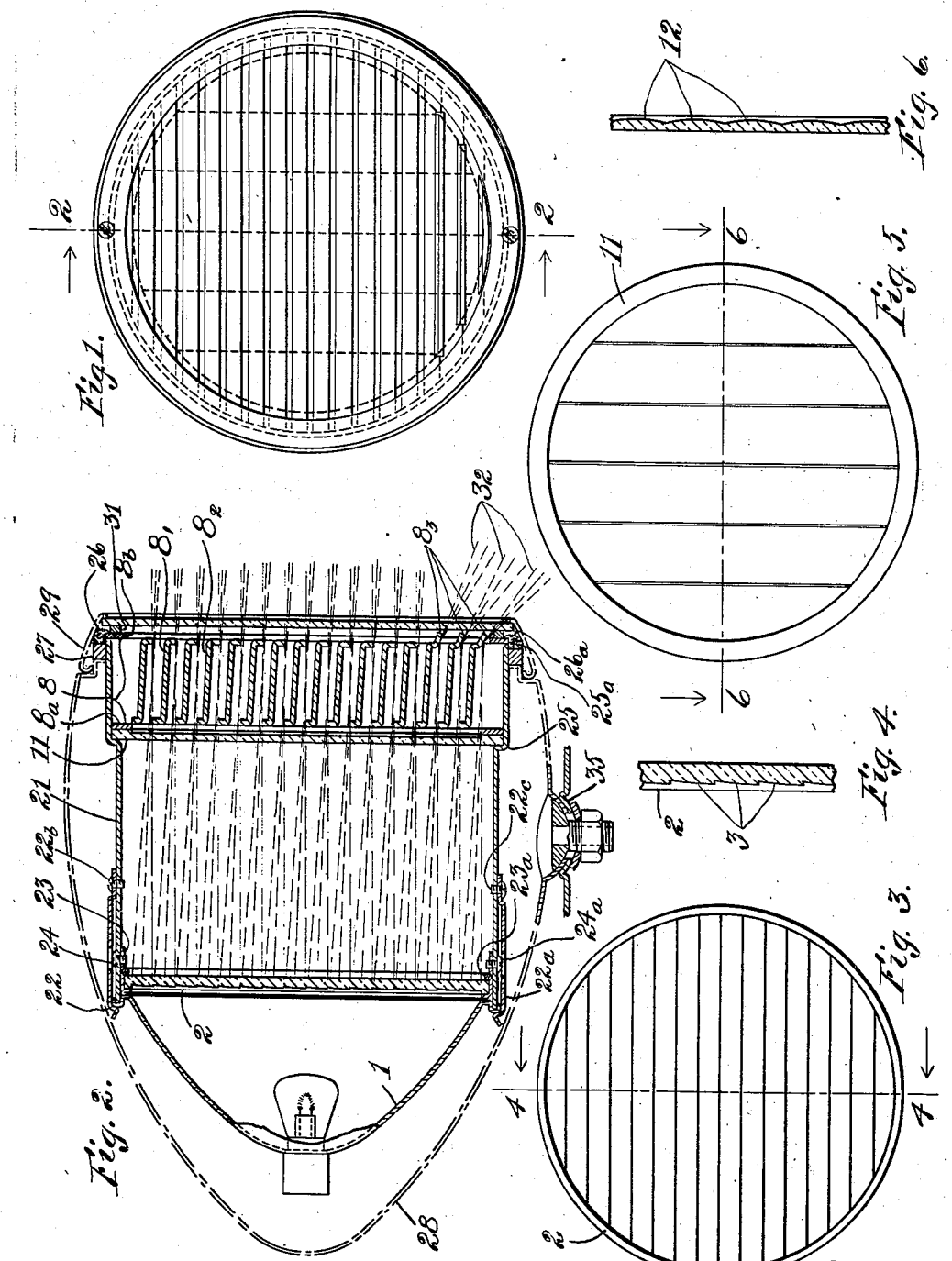

2,202,278

UNITED STATES PATENT OFFICE 2,202,278

LIGHTING DEVICE

Joseph C. White, Boston, Mass.; Alice G. White, Boston, Mass., executrix of Joseph C. White, deceased Application December 30, 1936, Serial No. 118,217

2 Claims. (Cl. 240—48.4)

My invention relates to devices in which a light is reflected and especially to headlights and even more especially to headlights of the automobile type; and the principal objects of my improvement are, first, to eliminate completely the objectionable and dangerous glare, admittedly the cause of many serious and often fatal accidents; and, second, to concentrate all the available light upon the road surface for a long distance, where it is needed, to prevent overdriving the road beam, as is now done commonly, due to the high speed of the modern car. This overdriving is the cause of further serious and often fatal accidents because, with the average short beam illumination, the object in the road ahead is not brought out clearly enough to be easily discernible to the driver before the rapidly moving car is within striking distance and beyond quick stoppage by braking. By my invention substantially all the light, heretofore lost by passing upward above a horizontal plane which is at the height of the top of the reflector, is now directed horizontally forward and, by gradually increasing minute angles, is bent downward to the road surface in a brilliant homogeneous beam without shadows.

In the drawings

Figure 1 is a front elevation of the preferred form of my lighting unit removed from a conventional headlight casing shown in Figure 2;
Figure 2 is a vertical section on line 2—2 of Figure 1;

Figure 3 is a vertical elevation of the main or primary lens as viewed from reflector side of lighting unit;
Figure 4 is a twice-size partial vertical section on line 4—4 of Figure 3;

Figure 5 is a front elevation of secondary or beam-spreading lens;

Figure 6 is a partial horizontal section on line 6—6 of Figure 5;

Figure 7 is an enlarged section of one of the lens ribs 3, Figures 2 and 4, showing its geometrical derivation, together with additional lens ribs showing light paths through same;
Figure 8 is a partial front elevation of a modified form of my light unit, removed from conventional casing;

Figure 9 is a horizontal section on line 9—9 of Figure 8;
Figure 10 is a partial vertical section on line 10—10 of Figure 8;

Figure 11 is a partial elevation of the lens 11ª, Figures 9 and 10;

Figure 12 is a section on line 12—12 of Figure 11;

Figure 13 is a front elevation of main lens, Figure 3, combined with secondary lens, Figure 5, in a molded, one-piece glass lens;

Figure 14 is a section on line 14—14, Figure 13;

Figure 15 is a section on line 15—15, Figure 13;

Figure 16 is a twice-size partial section shown in Figure 2, to clarify assembly of the detachable or insertable light unit; and Figure 17 is a side elevation of the diaphragm 8 removed from the light unit.

In the forms of my invention shown I use a novel optical system by which practically all the light from the parabolic reflector 1, Figure 2, is directed parallel with and upon the road surface, and no portion of the light beam can rise above the normal height of the headlight body when said light is attached horizontally to an automobile. This height is approximately thirty-six inches above the road surface, in other words, no part of the total beam departing from the headlight opening can rise above a line parallel with the horizontal axis of the reflector 1, Figure 2, while, on the other hand, a considerable portion of the total beam is directed downward toward the road surface at exceedingly small successive angles.

To accomplish this result I employ a lens (Figure 3) whose rear face 2 (Figure 4) is opposite, and adjacent to, the mouth of reflector 1 (Figure 2). This face 2 is formed with narrow horizontal ribs 3, shown in enlarged cross section in Figure 4. Each rib has a form which is one-half the arc of a circle of relatively large diameter, such as 2⅝ inches, said arc having a half-chord length, i. e. rib width, of $\frac{7}{16}$ inch. In their disposition horizontally across the face 2 of the lens, the radius of the circle of generation forms the base 4, Figure 7, of the half-arc and is defined herein as the sagitta of said arc, the end of the arc 5 being upward, as shown.

These horizontal ribs are, in effect, plano-convex cylindrically arcuate lenses having a radius of 1$\frac{7}{16}$ inches with a resultant focal length of 2⅝ inches, as shown twice size at 6, Figure 7. The narrowness of each horizontal rib permits a large number to be formed on the molded glass disc, Figure 3, all of the plano-convex cylindrically arcuate ribs having their foci 6 located in the same plane, which plane is perpendicular to the axis of the reflector and therefore, at the same distance from the lens face 2, Figure 7, so that each elongated, diamond-shaped space 7, between the foci is a shaded area through which no useful light passes except by diffusion.

In the said space 7 I place a diaphragm 8, Figures 2 and 17, having angularly disposed opaque pieces 8₁, 8₂, etc., Figures 2 and 7, for the purpose of shielding the reflecting mirror surface 1, Figure 2, from the approaching observer whose eyes are above the horizontal axis of the headlight. The tip 9 of opaque piece 8₁ and the tip 10 of piece 8₂ coincide with a horizontal line X—X (Figure 7) which forms the base of each plano-convex half-cylinder lens rib, thus preventing any view of the reflector surface 1 (Figure 2), unless the eyes of the observer are brought below the horizontal line parallel with the headlight horizontal axis and which forms the base of the topmost plano-convex half-cylinder lens rib. The diaphragm pieces 8₁, 8₂, 8₃, etc., lying, as they do, in the unlighted spaces between the foci, do not interfere with any of the outgoing light rays which form the total beam, but are illumined faintly by diffusion.

The diaphragm 8, Figures 2 and 17, consists of two sheet metal rings 8a, 8b to which are spot-welded at their ends, the pieces 8₁, 8₂, 8₃, etc.

By means of the glass spreader lens 11, (Figure 2) and shown in elevation in Figure 5, the compact screen figure produced by the primary lens, Figure 3, can be broadened to any desired width, depending upon the curvature of the vertical ribs 12, Figure 6. In so spreading the beam there is no change in the beam height, due to the lens action of the lenticular ribs 3, Figures 4 and 7.

The lens shown in Figure 3 and the lens shown in Figure 5 may be consolidated in a single glass molding to produce a lens, Figure 13, with ribs 3 facing the reflecting surface 1, Figure 2, and with the vertical ribs 12, Figures 6 and 15, formed on the opposite side.

In order that the lighting unit (Figure 1) may be readily inserted in any suitable headlight casing, I mount the light unit elements, consisting of reflector 1, primary lens 2, secondary lens 11 and the diaphragm 8, Figure 2, in a cylindrical shell 21 (Figure 2) against the rear end of which is detachably mounted the reflector 1 by means of spring hooks 22, 22a held by screws 22b, 22c. The primary lens (Figure 3) is held in its holder 23 by the spring retaining ring 23a and the holder 23 is held in position in the shell 21, by screws 24, 24a. The shell 21 is shouldered by enlargement 25 and this enlargement terminates in a flange 25a to which is fastened by screws 26, 26a the diaphragm front ring 8b, while the diaphragm back ring 8a presses against and holds firmly the secondary glass lens 11 against the shell seat 25. To the shell flange 26 is cemented, preferably, the cork gasket 27 which seals the joint between flange 25a and headlight casing 28 when the headlight casing rim 29 is attached to casing 28 by the means provided by the manufacturer of that particular headlight case body. To clarify this assembly, I show in Figure 16 a twice-size partial section on line 2—2 (Figure 1). By this method of mounting the lighting unit in a self-contained, removable shell 21, it makes possible the easy adaptation of said unit, (Figure 1), to existing headlight bodies simply by detaching casing rim 29, removing the old reflector and old glass lens and inserting the new unit, including the plain glass dust cover 30 which is cemented, preferably, to the diaphragm ring 8b with an intervening gasket 31, made of paper or other suitable material.

By extending the front edges of angularly disposed diaphragm plates 8₃, Figures 2 and 17, and bending said extended front edges downward at several angles varying from 18° to 25° the lower portion of the total beam is bent to illumine the roadway immediately in front of the automobile, as shown by rays 32, Figure 2.

In Figure 9 I show a modified form of my invention in which the spreader lens 11a, Figure 11, whose vertical ribs 12, Figure 12, face the reflector 13. This lens is formed with plano-convex vertical cylindrical ribs 12 whose foci 14 are in the same vertical plane, said plane being perpendicular to the axis of the reflector. In the shaded spaces 15, 15, where no useful light passes, lie the vertical supports 16, 16a, which support the planes 17, 17, Figure 10, which, when the horizontal axis of the headlight is tipped very slightly in its position on the automobile, by means of the usual ball and socket joint 35, Figure 2, completely prevents an approaching observer from viewing any part of the reflecting surface of the reflector 13. The planes 17, 17, by virtue of the close spacing of the vertical supports 16, 16a may be made of extreme thinness, to avoid light loss due to the sum of their thicknesses. In practice I use spring steel ribbon 2 inches wide and .002 inch thick, and spaced horizontally $\frac{3}{4}$ inch apart. The upper surfaces of each plane or plate is coated with a suitable mat color, preferably blue, to absorb the red rays impinging upon them by diffusion and by non-horizontal light pencils due to faults in the surface of commercial parabolic reflectors, and the size of the lamp filament. By this arrangement of the lens (Figures 11 and 12) the vertical supports 16, 16a obstruct no light. The cup-shaped vertical support holder 18, which supports vertical ribs 16a, is punched with the vertical slots 19, 19, Figure 8, which allow the rays 20 to pass outward without light losses while the opaque spacers 20a, 20a serve to shield from sight the vertical supports 16, 16a.

The flanged ring 18a is the holder for vertical supports 16, and acts also as a stop for the lens 11a which is held against said ring 18a by the spring-ring 18b expanded into the containing shell 34, Figure 9.

The reflector 13 is detachably held to the shell 34 by the spring hooks 32, 32a, said hooks being attached to the said shell 34 in the same manner as the spring-hooks 22, 22a are fastened to the shell 21, Figure 2.

Hooks 32 and 32a hold the reflector to the shell 34 in Figure 9.

What I claim is:

1. A device of the character described comprising a parabolic reflector, a light located in the focus of said reflector, means to direct substantially all the light beam below a horizontal plane which is substantially at the height of the top of the reflector, said directing means including a lens whose rear face is opposite and adjacent to the mouth of the reflector, said face being formed of a series of like horizontal ribs, each rib face cross section having the form of half an arc, said arc being a segment of a circle of relatively large diameter, the horizontal base of said half an arc being the sagitta of said arc, and a light-spreading lens located approximately in the vertical plane of the foci of said lens ribs and having a series of like vertical plano-cylindrical prisms facing said reflector, a vertical diaphragm located in proximity to said spreading lens having a series of angularly disposed relatively non-transparent thin plates crossing the plane of the foci of said lens ribs and having rear upwardly turned and front downwardly turned flanges, the edges of which plates coincide with the plane of the sagitta of the arcs of the respective lens ribs.

2. A device of the character described comprising a parabolic reflector, a light located in the focus of said reflector, means to direct substantially all the light beam below a horizontal plane which is substantially at the height of the top of the reflector, said directing means including a lens whose rear face is opposite and adjacent to the mouth of the reflector, said face being formed of a series of like horizontal ribs, each rib face cross section having the form of half an arc, said arc being a segment of a circle of relatively large diameter, the horizontal base of said half an arc being the sagitta of said arc, and a light-spreading lens located approximately in the vertical plane of the foci of said lens ribs and having a series of like vertical plano-cylindrical prisms facing said reflector, a vertical diaphragm located in proximity to said spreading lens having a series of angularly disposed relatively non-transparent thin plates crossing the plane of the foci of said lens ribs and having rear upwardly turned and front downwardly turned flanges, the edges of which plates coincide with the plane of the sagitta of the arcs of the respective lens ribs, the lower plates having front edge extensions inclined outwardly more effectively to divert non-horizontal light rays upon the road surface.

JOSEPH C. WHITE.